United States Patent [19]
Tymianski et al.

[11] Patent Number: 5,606,638
[45] Date of Patent: Feb. 25, 1997

[54] ORGANIC SCINTILLATOR SYSTEMS AND OPTICAL FIBERS CONTAINING POLYCYCLIC AROMATIC COMPOUNDS

[75] Inventors: Jacob R. Tymianski; James K. Walker, both of Gainesville, Fla.

[73] Assignee: Nanoptics Incorporated, Gainesville, Fla.

[21] Appl. No.: 579,636

[22] Filed: Dec. 26, 1995

[51] Int. Cl.$^6$ ...................................................... G02B 6/16
[52] U.S. Cl. .................. 385/143; 385/123; 252/301.17; 252/301.18; 250/328
[58] Field of Search .................... 385/143, 123, 385/141–142, 144–145; 252/301.18, 301.17; 250/328

[56] References Cited

U.S. PATENT DOCUMENTS

| | | | |
|---|---|---|---|
| 3,960,756 | 6/1976 | Noakes | 252/301.18 |
| 4,594,179 | 6/1986 | Harrah et al. | 252/301.17 |
| 5,298,189 | 3/1994 | Kauffman | 252/301.17 |
| 5,308,986 | 5/1994 | Walker | 250/370.11 |
| 5,420,959 | 5/1995 | Walker et al. | 385/143 |
| 5,435,937 | 7/1995 | Bell et al. | 252/301.18 |

FOREIGN PATENT DOCUMENTS 0606732  7/1994  European Pat. Off. .......... G01T 5/08

OTHER PUBLICATIONS

Brown, et al., Nuclear Electronics 1, 15, (1959) (no month).
Furst., Phys. Rev., 583 (155), Feb.
Wunderly et al., Appl. Radiat. Isot.; vol. 41, No. 9; pp. 809–815; (1990), Feb.
Offen et al., Journal of Chemical Physics, 43, 11, 4096 (1965) Dec.
J. B. Birks, "the Theory and Practice of Scintillation Counting", Pergamon Press, (1964), pp. 273–290 (No month).
G. F. Knoll, "Radiation Detection and Measurement", J. Wiley and Sons, 1998, Chapter 8 (No month).

*Primary Examiner*—John D. Lee
*Assistant Examiner*—Ellen Eunjoo Kang
*Attorney, Agent, or Firm*—Breneman, Georges & Krikelis, P.A.

[57] ABSTRACT

A class of polycyclic aromatic compounds containing at least two fused rings, is used to produce very bright liquid or plastic scintillators. When a member of this class, such as pyrene, is added at high concentration to a liquid or polymeric organic solvent, scintillation light output may be increased by between 40 and 100% as compared to existing commercial scintillating compositions. These new bright scintillator compositions can be used in scintillating optical fibers and plates made therefrom. These new scintillating optical fiber plates are particularly useful for diagnostic medical X-ray detection, and superior spatial resolution particle detection and measurement of high energy particles and radiation.

45 Claims, No Drawings

5,606,638

ORGANIC SCINTILLATOR SYSTEMS AND OPTICAL FIBERS CONTAINING POLYCYCLIC AROMATIC COMPOUNDS

BACKGROUND OF THE INVENTION

1. Field of the Invention

This invention relates to high efficiency plastic and liquid scintillators which emit light when exposed to ionizing radiation. More particularly, this invention relates to material compositions for providing high-intensity, scintillation light output for making scintillators more sensitive to the presence of ionizing radiation.

2. Description of Related Art

Conventional scintillators have been developed for detection of high energy particles and radiation, such as x-rays, γ-rays, neutrons, and the like. A scintillation detecting system is based on the use of a scintillation composition to convert a portion of the energy imparted to the composition by incident ionizing radiation, to visible or ultra-violet scintillation light. Absolute scintillation (or conversion) efficiency of a composition is defined as the ratio of the energy carried by the visible or ultra-violet light, to the energy lost in the composition by the incident ionizing radiation. The light emerging from a scintillator impinges upon some photo-electric device, e.g., a photomultiplier (PM), or charge coupled device (CCD) where it is converted into an electrical pulse. This electrical pulse is then amplified and recorded by a standard electronic data acquisition system. Details of scintillators in general, and plastic and liquid organic scintillators in particular, are described in publications such as the books by J. B. Birks, "The Theory and Practice of Scintillation Counting", Pergamon Press, (1964), and by G. F. Knoll, "Radiation Detection and Measurement", J. Wiley and Sons 1989 particularly Chapter 8. Plastic scintillators may be a solid sheet or plate or may be in the form of an optical fiber or fiber optic plate such as disclosed in European Patent Publication 0 606 732 A1, Jul. 20, 1994.

Conventional plastic scintillators typically are comprised of a polymeric matrix, e.g., poly(vinyltoluene) (PVT), and one or more fluors (fluorescent compounds), e.g., paraterphenyl (PT) and diphenylstilbene (DPS). Such a scintillator material is haze free, optically transparent, solid and stable. Methods of making and using such conventional plastic scintillators are disclosed in Harrah et al., U.S. Pat. No. 4,594,179. Conventional liquid scintillators, typically are comprised of a liquid solvent matrix, e.g., toluene, and one or more fluors as described supra. Methods of making liquid scintillators are disclosed by J. B. Birks, supra, on pages 273–290.

Generally, a high absolute scintillation efficiency of a scintillator composition is desirable to achieve high detection sensitivity of ionizing radiation. Scintillation efficiency is a function of several parameters, including the type of solid or liquid matrix and the type of fluors employed. Typically, light output relative to anthracene is less than 70% for plastic and less than 80% for liquid scintillators and corresponding absolute scintillation efficiencies are less than about 3% and 4% respectively. Since modern scintillator solute fluors typically have fluorescent quantum efficiencies of close to 100%, a substantial increase in plastic composition scintillation efficiency by alternative choice of fluors is unlikely.

Attempts have been made to increase scintillation efficiency of plastic scintillators by using other plastic matrixes such as polyvinyxylene, polyisopropyl styrene and polyvinyl naphthalene, and copolymers of monomers represented in polymers listed above. Such attempts have resulted in increasing the scintillation efficiency by up to about 50%. Such approaches suffer from one or more disadvantages: the monomers or polymers are commercially unavailable or prohibitively expensive, or polymer compositions are brittle and subject to surface crazing or deterioration.

Addition of naphthalene to liquid and solid scintillators has been explored as a way to increase their scintillation efficiency. Furst et al. (Phys. Rev., 97, 583 (1955)) added large quantities (up to about 25% by weight) of naphthalene to a variety of liquid scintillators to improve their efficiency. The naphthalene was regarded as a secondary solvent. Such mixtures were found to be less prone to impurity quenching (light output reduction due to the presence of impurities). Brown, et al. (Nuclear Electronics 1, 15, 1959)) added naphthalene to solid plastic scintillators where polystyrene (PS) and polymethylmethacrylate (PMMA) were used as matrices. Addition of less than about 3% by weight of naphthalene to a PS mixture containing the fluor 2,5-diphenyl oxazole (PPO), did not chance maximum scintillation efficiency of the mixture. When about 10% by weight of naphthalene is added to PMMA, this polymer is transformed from an extremely inefficient matrix to one with about 50% of the scintillation efficiency of PS.

High concentrations (i.e., between about 5 to 15% by weight) of naphthalene nave been found to embrittle plastic scintillators which dramatically limits its use in fiber optic scintillators where high fiber flexibility typically is required. Also, during high temperature processing of polymeric scintillatots containing naphthalene, such as coextrusion into a clad scintillating optical fiber, the high volatility of naphthalene (boiling point is 217° C.) is found to produce micro bubbles in the material which scatter light and reduce detection efficiency for incident penetrating radiation.

Although advances have been made to produce more efficient solid, liquid and fiber scintillators, there still exists a need to produce scintillator with higher absolute scintillation efficiency; a need to produce flexible plastic scintillating fibers free of micro bubbles, cracks or crazing; and a need to produce such scintillators economically.

SUMMARY OF THE INVENTION

These needs are met by the use of the scintillator of this invention in a system for detecting incident penetrating radiation, comprising:

A) a scintillator composition for converting the incident penetrating radiation to visible light, comprising:
  1) a matrix material; and dissolved therein,
  2) a polycyclic aromatic compound which is an alkyl substituted naphthalene, aryl substituted naphthalene, or a compound containing at least three fused rings, wherein the polycyclic aromatic compound is present at about 5, or more, percent of the scintillator weight; and
  3) 0 to about 3% of the scintillator weight of a fluorescent material; and B) a detection system for recording the visible light.

An added embodiment of this invention, is where the scintillator converts the incident penetrating radiation to visible light which is partially composed of excimer radiation emission.

In another embodiment of this invention, a scintillator composition for converting incident penetrating radiation to visible light, comprises:

1) a polymeric matrix material; and dissolved therein,
2) naphthalene which is present at about 15, or more, percent of the scintillator weight; and
3) 0 to about 3% of the scintillator weight of a fluorescent material.

A further embodiment of this invention is a solid scintillating plate for detecting incident penetrating radiation over the plate area, comprising the scintillator composition of this invention wherein the matrix material is a crosslinked polymeric matrix material.

Another embodiment of the invention is a scintillating optical fiber for detecting incident penetrating radiation, comprising:

a) an inner plastic core fiber, wherein the inner plastic core fiber is transparent in at least a portion of the visible radiation spectrum and has an index of refraction of about 1.40 or greater, and wherein the inner plastic core fiber comprises a scintillator composition for converting the incident penetrating radiation to visible light, the scintillator composition comprising:
  1) a polymeric matrix material; and dissolved therein
  2) a polycyclic aromatic compound which is an alkyl substituted naphthalene, aryl substituted naphthalene, or a compound containing at least three fused rings, wherein the polycyclic aromatic compound is present at about 5, or more, percent by weight of the inner plastic core fiber weight; and
  3) 0 to about 3% of the inner core fiber weight of a fluorescent material; and
b) a plastic cladding material which surrounds the inner plastic core fiber and which has an index of refraction which is less than the index of refraction of the inner plastic core fiber by a difference of about 0.05 or more.

An added embodiment of this invention, is a scintillator plate to convert incident penetrating radiation to visible light to form a photon image. This plate comprises an array of the scintillating optical fibers of this invention, the axis of each fiber being substantially parallel to the path of the incident penetrating radiation.

DETAILED DESCRIPTION OF THE INVENTION

The present invention relates to a novel scintillator system for detecting incident penetrating radiation, which comprises a scintillator for converting the incident penetrating radiation to visible (or UV) light and a detection system for recording the visible (or UV) light. For the purpose of this invention the term "penetrating radiation" is intended to include high energy particles and ionizing radiation such as x-rays, γ-rays, αparticles, βparticles, thermal neutrons, and the like. The present invention particularly relates to a novel high efficiency scintillator used in the scintillator system. Based on its total weight, the scintillator of this invention contains about 5, or more, percent by weight (hereinafter designated "% bw") of a polycyclic aromatic compound. Preferred polycyclic aromatic compounds include naphthalene, naphthalene substituted with an alkyl or aryl group, a compound containing at least three fused rings or the like. These high efficiency scintillators surprisingly are produced by the mixed solvent method wherein large quantities (up to about 30% bw) of a polycyclic aromatic compound is dissolved in a conventional matrix solvent. Optionally, the scintillator may have dissolved therein at least one fluorescent material and/or at least one metal moiety. In a preferred embodiment of this invention, the scintillator converts incident penetrating radiation in part to excimer radiation emission. The detection system used in the scintillator system of this invention, may be any photoelectric or photographic system conventionally used for recording the emitted scintillator light.

In a particularly preferred embodiment of this invention, the matrix material is a polymeric material having dissolved therein the polycyclic aromatic compound. This new polymeric composition forms a very efficient plastic scintillator with a controllable and reduced brittleness, and high transparency to scintillation light emission. Whereas previous approaches to increase the scintillation efficiency of plastic scintillators have resulted in up to a 50% increase, the plastic scintillator of this invention permits up to 100% increase. Such a high efficiency can be achieved using polystyrene as the matrix material and more than 10 or 15% by weight of polycyclic aromatic compound. Furthermore even higher scintillation efficiency can be achieved using other polymers, such as polyvinyl toluene or polyvinylxylene with the aromatic compound. An added advantage of using very high concentrations of polycyclic aromatic compound in plastic scintillators is the decreasing degree of brittleness of the plastic composition for concentrations greater than 10 or 15% by weight. This decrease in brittleness can be contrasted with undesirable increase in brittleness when naphthalene was used in the range up to 10% by weight. Particularly surprising is the discovery that when 15% by weight or more of naphthalene is used in the plastic scintillator the trend is reversed and brittleness decreases significantly. A further advantage when the polycyclic aromatic compound is present in the plastic material at more than about 10 or 15% by weight, is that the processing temperature can be lowered sufficiently that micro bubbles of the aromatic compound are not formed thereby reducing unwanted scattering of scintillation emission.

SCINTILLATOR

The present invention particularly relates to novel high efficiency, organic, scintillator compositions. These high efficiency scintillators surprisingly are produced by the mixed solvent method wherein up to about 30% bw of a polycyclic aromatic compound which is an alkyl substituted naphthalene, aryl substituted naphthalene, or a compound containing at least three fused rings, is added to a conventional matrix solvent. These scintillator compositions are particularly useful for scintillation detectors in which very low energy is deposited by ionizing radiation.

The polycyclic aromatic compound consists of primarily benzenoid rings in a fused ring structure in which there are carbon atoms belonging to two or more rings. Polycyclic aromatic compounds of this type include methyl naphthalene, dimethyl naphthalene, phenyl naphthalene, phenanthrene, chrysene, pyrene, 3:4-benzpyrene, naphthacene, triphenylene, acenapthene, fluoranthene, simple derivatives thereof, and the like. The simple derivatives includes $C_1$–$C_4$ alkyl, phenyl, toluyl, and the like. Matrix solutions of these polycyclic aromatic compounds of this type typically have an absorption $\lambda_{max}$, i.e., the spectral wavelength at which maximum incident radiation is absorbed, which ranges from about 280 mµ to about 330 mµ, and have related emission $\lambda_{max}$, which ranges from about 310 mµ to about 400 mµ. Such absorption and emission spectra are primarily characteristic of each individual, solvated polycyclic aromatic molecule. Based on its total weight, the scintillator of this invention contains about 10, or more, % bw of the polycyclic aromatic compound, and preferably, about 15, or more, % bw of the polycyclic aromatic compound. Typically, the polycyclic aromatic compound useful in this invention has a boiling or sublimation point at atmospheric pressure of about 240° C. or greater.

The scintillator matrix material may be either a liquid such as an organic solvent, a polymeric solid, or any combination thereof. The matrix material should be transparent in at least a portion of the visible electromagnetic spectrum and preferably at 400 nm or longer. The matrix material should be capable of completely dissolving the polycyclic aromatic compounds of this invention along with any fluorescent materials and metal materials, to produce an optically clear fluorescent solution which is substantially free of macro size particles which would scatter fluorescent light.

Liquid matrix material may be chosen from any conventional organic solvent for the polycyclic aromatic compounds and any desired fluorescent materials. Preferably, the solvent is an aromatic solvent such as benzene, toluene, xylene, and the like. One or more of these solvents may be used either individually or in mixture to disperse the polycyclic aromatic compound and any added components. Any conventional method may be used to disperse the liquid scintillator components and any conventional means may be used for containing the liquid scintillator in the scintillator system of this invention.

Polymeric solid matrix material may be a polymeric material formed by free radical or condensation polymerization. Illustrative of such polymeric materials are vinyl, styryl, vinylxylene, acrylic, vinylnaphthalene, and diene polymers and copolymers thereof, and polyesters, polyamides, polyimides and the like. The polymeric matrix material typically comprises one or more aromatic polymer(s) or copolymer(s). The aromatic polymer may be polystyrene, polyvinyltoluene, polyvinylxylene, polyvinylbiphenyl, polyvinylterphenyl, polyvinylanthracene, and the like, or mixtures thereof. The aromatic copolymer may be a copolymer of styrene, vinyltoluene, vinylxylene, a $C_2$ to $C_{20}$ alkyl-styrene, divinylbenzene, or combinations thereof. Alternatively, the polymeric matrix material may comprise one or more acrylic polymer(s) or copolymer(s) having dissolved therein a polycyclic aromatic compound described supra, or an additional aromatic compound such as naphthalene. Preferably the acrylic polymer is poly(methyl methacrylate). Typically, the polymeric matrix material will have a glass transition temperature (Tg) of about 40° C. or higher. The scintillator components, including the polycyclic aromatic compound, may be dissolved in the polymeric matrix by any conventional method depending on the end use of the resulting fluorescent composition formed. The components and the polymer may be dissolved in a cosolvent therefore and applied to a substrate and dried to form an adherent polymeric coating or a free film of the scintillator material. The components may also be blended in melt polymer and then extruded or cast into any desired shape, e.g., into a film, a sheet, a rod, a disc, a fiber, and the like. The components may also be dissolved into the material which is then polymerized to form a solid polymer solution of the compound. Typically the monomeric pre-polymer material is a free radical, addition polymerizable monomer having one or more terminal, ethylenically unsaturated groups, and preferably the monomer of this type is taken from the group consisting of styrene, vinyltoluene, $C_2$ to $C_{20}$ alkyl styrene, divinylbenzene, methyl methacrylate and mixtures thereof. Preferred polymeric matrix materials are styrene, vinyltoluene and vinylxylene. It is characteristic of the polycyclic aromatic compounds of this invention, that they frequently possess excellent solubility in most of these polymeric matrices. Preferably the solubility of the polycyclic aromatic compound of the invention in the matrix should be at least about 5% bw and preferably more than about 10% bw.

In a preferred embodiment of this invention, an aromatic polymeric or copolymeric matrix material, such as polystyrene, contains about 20% bw, or more, of pyrene as the sole fluorescent component dissolved therein. The absolute scintillation efficiency of polymeric scintillator compositions of this invention is about twice, i.e., about 6 that of the best commercially available polystyrene matrix plastic scintillator.

In another embodiment of this invention, a plastic scintillator contains naphthalene at very high concentrations, i.e., 15 or 20% bw or greater. Thus a scintillator composition for converting the incident penetrating radiation to visible light, comprises: (1) a polymeric matrix material; and dissolved therein, (2) naphthalene which is present at about 15, or more, percent of the scintillator weight (preferably 20 or more percent); and (3) 0 to about 3% of the scintillator weight of a fluorescent material. The plastic scintillator of this invention may be a solid, a semi-solid or a liquid depending on the nature of the polymeric material as well as the nature and quantity of polycyclic aromatic compound contained therein. When a plastic scintillator contains very high concentrations of a liquid polycyclic aromatic compound, e.g., 20% bw or more, the scintillator formulation typically will be a soft semisolid or liquid possessing limited or no mechanical stability. Thus, due to the large amount of polycyclic aromatic compound in the matrix, the structural integrity of a scintillator such as a solid plate scintillator, may, or may not, be adequate for the desired application. When it is inadequate, the matrix can be crosslinked to enhance its structural strength. In addition to improving structural integrity of the scintillator, crosslinking also significantly reduces diffusion and subsequent evaporation or sublimation of additive molecules. Such a scintillator system wherein the polymeric matrix material is a crosslinked polymeric material, may be formed during polymerization using a crosslinking agent which is a multfunctional addition polymerizable monomer having two or more terminal ethylenic groups. Such a multifunctional addition polymerizable monomer may be divinyl aromatic compounds, diacrylate compounds, dimethacrylate compounds, triacrylate compounds, trimethacrylate compounds, or combinations thereof. Representative of such crosslinking compounds include, but is not intended to be limited thereby: divinyl benzene, hexane-dioldiacrylate, bisphenol A diacrylate, trimethyloltriacrylate, pentaerytritol triacrylate or tetraacrylate, as well as analogous methacrylate compounds. Preferred crosslinking compounds contain aromatic character such as divinyl benzene.

The scintillator of this invention may contain at least one fluorescent material (hereinafter identified as a "fluor") in addition to the polycyclic aromatic compound. The choice of fluor is dependent upon the choice of polycyclic aromatic compound and solvent matrix. The fluor typically is an organic dye which is chosen so that its absorption spectrum effectively overlaps the emission spectrum of the polycyclic aromatic compound in the solvent matrix. This overlap is required since the initial energy lost by incident ionizing radiation, principally to the solvent matrix, is transferred efficiently to the polycyclic aromatic compound and thence to the fluor solute. A significant amount of the ionization energy is also lost directly to the polycyclic aromatic compound which with its high quantum efficiency transfers its energy efficiently to the fluor solute. For many applications requiring scintillation light in the range 400–500 mμ, such as for a good match to the response of a photomultiplier or other opto-electronic detector, there typically is no need for a fluor to be added to the scintillator composition. A fluor may be added which effectively absorbs the energy from the polycyclic aromatic compound, and subsequently fluoresces rapidly, (≦8 nsec), at a longer wavelength. Typically, the fluor comprises about 0.01% bw or more of the weight of the scintillator, and typically, no more than about 3.0% bw. An advantage of using one or more fluors at low concentration (e.g., ≦10$^{-3}$ M) is that there is little reabsorption of its fluorescent light thereby permitting transmission of the light over long distances. A useful class of organic fluorescent materials for use as fluors in this invention are the oligophenylene fluors disclosed by Wunderly et al., APPL. RADIAT. ISOT.; Vol. 41, No. 9; pp. 809–815; 1990, which are highly resistant to quenching by impurity atoms in the polymer matrix. Also useful as fluors in this invention, are the 1,4-bis(2-benzazolyl)-benzene fluors disclosed in Kauffman, U.S. Pat. No. 5,298,189 which is incorporated herein by reference. Preferred for use as a fluor, is a compound selected from a group consisting of 2,7-dipnenylfluorene; 2,7-diphenyl-9,9-dipropylfluorene; 2,7-di(p-methoxyphenyl)-9,9-dipropylfluorene; 2,7-di(t-amylphenyl)-9,9-dipropylfluorene; 2,2'-bis(7-phenyl-9,9-dipropylfluorene); 4,4"-di-t-amyl-p-terphenyl; 1,4-bis(2-benzoxazolyl)-2-hydroxybenzene; 1,4-bis(benzoxazolyl)-2-(methanesulfonamido) benzene; 1,4-bis(5-ethyl-2-benzoxazolyl)-2-(methanesulfonamido)-benzene; 1,4-bis(2-benzoxazolyl)-2-(tolsylamino)-benzene; 1,4-bis(5-phenyl-2-benzoxazolyl)-2-hydroxy-benzene; 1,4-bis(5-ethyl-2-benzoxazolyl)-2-hydroxy-benzene; 1,4-bis(5-t-butyl-2-bezoxazolyl)-2-hydroxy-benzene; 1,4-bis(5,7-dimethyl-2-benzoxazolyl)-2-hydroxy-benzene; 1,4-bis(1-methyl-2-benzimidazolyl)-2-(methanesulfonamido) benzene; and combinations thereof.

In addition to the polycyclic aromatic compound and any fluor the scintillator of this invention also may contain one or more metal moieties which is dissolved or microscopically dispersed therein to produce an optically clear solution or microscopic dispersion which is substantially free of macro size particles which would scatter fluorescent light. The term "microscopic dispersion" is intended to mean a dispersion in the matrix material wherein the particle size of the polycyclic aromatic compound, or other additives, is about 1 μm or less. Typically, the metal moiety is a moiety selected from the group consisting of lead, bismuth, tin, lithium six (i.e., $^6$Li), boron ten (i.e., $^{10}$B), indium, gadolinium, and combinations thereof. Depending on its chemical and/or crystalline structure, the metal moiety may, or may not emit light when excited by radiation. Thus, the metal moiety may be a metal compound in the class known as phosphors which emit light when excited by radiation. Illustrative of such phosphors is gadolinium oxysulphide. Preferably the metal moiety is an inorganic compound or an organo-metallic compound. Illustrative of organo-metallic compounds which may be incorporated in the scintillator of this invention are: tetraethyl lead, tetrabutyl lead, tetraphenyl lead, triphenylmethyl lead, lead hexahydrobenzoate, hexahydroborate, trimethylphenyl tin, dicarbadodecarborane (also known as "carborane"), and the like. When boron containing organo-metallic compounds are used, the boron ten isotope ($^{10}$B) content therein may be enriched, e.g., the boron in dicarbadodecarborane may be about 95% by weight or greater of the boron ten isotope ($^{10}$B). The metal moiety may be chemically bonded to the matrix material. Preferably, the metal moiety chemically bonded to a polymeric matrix material is a metal salt of a polymer or copolymer containing carboxyl groups, such as, a lithium or lead salt of a polymer or copolymer of p-carboxy-styrene and the like. The metal moiety also may be dispersed as a free metal or salt within the matrix material. In such dispersions, the metal moiety is microscopically dispersed. Typically, the metal moiety comprises about 1% bw of the scintillator and preferably, between about 2% bw and about 15% bw.

In addition to the spectral properties described supra, some of the polycyclic aromatic compounds exhibit formation of excimers or excited dimers in both organic solvents and solid polymeric materials. The excimer may subsequently fluoresce with a characteristic spectrum, which lacks vibrational structure and which occurs at longer wavelength than would occur from a single molecule. Pyrene when present in polystyrene at concentrations of ≧5% bw, shows this most clearly by preferring to fluoresce with a broad featureless spectrum at about 475 mμ and a long fluorescence time (Offen, et al., Journal of Chemical Physics, 43, 11, 4096, (1965)). Since pyrene's absorption spectrum has a major peak at about 340 mμ, there is negligible reabsorption of the pyrene exciter fluorescence even at the high, e.g. about 20% bw, concentrations of the polycyclic aromatic compound, pyrene. When scintillators containing pyrene, or any other such polycyclic aromatic compound, emit excimer radiation, there is no need for an additional fluor to achieve good light transmission over a long distance. Such excimer scintillators are particularly useful in those applications where the long fluorescence time of pyrene can be tolerated, such as with conventional single-frame radiography, nondestructive inspection, and the like. In a preferred embodiment of this invention, the scintillator converts incident penetrating radiation at least partially to excimer radiation emission. For the purpose of this invention, the term "excimer radiation" is intended to include fluorescence with a broad featureless spectrum characteristic of two or more associated polycyclic aromatic molecules in a liquid or solid matrix.

Another embodiment of this invention is a scintillator system for detecting incident penetrating radiation, comprising: (A) a scintillator for converting the incident penetrating radiation to visible light, comprising: (1) an aromatic polymeric solid or liquid matrix material; and dissolved therein, (2) about 15, or more, percent by weight of naphthalene or an alkyl or aryl substituted naphthalene; and, (3) at least one fluorescent material; and, (B) a detection system for recording the visible light. The substituted naphthalene contains one or more alkyl or aryl substituents including $C_1$-$C_4$ alkyl, phenyl, toluyl, and the like. Preferred for use in this invention are substituted naphthalenes such as methylnaphthalene, dimethylnaphthalene, and the like. In the scintillator of this invention the aromatic polymeric solid matrix material typically comprises one or more aromatic polymer(s) or copolymer(s) as described supra, and the aromatic liquid matrix material typically comprises one or more aromatic solvents such as benzene, toluene, xylene, and the like. Likewise, the fluorescent materials which are useful in the scintillator of this invention, may be any of the fluors described supra.

DETECTION SYSTEM

The detection system used in the scintillator system of this invention, may be any photo-electric or photographic system conventionally used for recording emitted scintillator light. The photo-electric system typically comprises a photo-electric device, such as a photomultiplier ("PM"), or charge coupled device ("CCD") which converts emitted scintillator radiation into an electrical pulse which is then amplified and recorded by a standard electronic data acquisition system. The photographic system may be any photographic film which is sensitive to the emitted scintillator light and which then may be developed into a recorded image, such as conventional x-ray film systems. The detection system may also be an amorphous, pixelated, silicon plate detector; an avalanche photodiode system; or the like.

SCINTILLATING OPTICAL FIBER

The present invention also relates to a novel scintillating optical fiber and its use in an array as a scintillator plate for imaging with penetrating radiation, particles and the like. The polymeric scintillator compositions of this invention are particularly useful for scintillating fiber optic detectors in which very low energy is deposited by ionizing radiation such as for diagnostic medical X-rays wherein the energy deposited in a scintillating fiber can be as low as 15 KeV. High detection efficiency of this low energy is essential to minimize the dose given to the patient and a high absolute scintillation efficiency is necessary. In another application of this invention, scintillating optical fibers may be utilized to detect the location of high energy particles emanating from a collision of particles in a colliding beam machine. Improved particle localization can be achieved if the diameter of the fibers is reduced, but, when the fiber diameter is smaller, a lower ionization energy is deposited in the fiber. Consequently, a scintillating fiber with high absolute scintillation efficiency is needed to provide higher spatial resolution in the detection of particles traversing the fiber. The scintillating optical fibers of this invention achieves the detection efficiency required of these applications.

In the present invention, a scintillating optical fiber for detecting incident penetrating radiation, comprises: (a) an inner plastic core fiber, wherein the inner plastic core fiber is transparent in at least a portion of the visible radiation spectrum and has an index of refraction of about 1.40 or greater; and (b) a plastic cladding material which surrounds the inner plastic core fiber and which has an index of refraction which is less than the index of refraction of the inner plastic core fiber by a difference of about 0.05 or more. The inner plastic core fiber comprises the scintillator composition of this invention wherein the matrix material consists essentially of a polymeric matrix material, as fully described supra. The scintillating optical fiber of this invention also may have an outer cladding material which surrounds the plastic cladding material and which is substantially opaque to visible radiation. In an embodiment of this invention the inner plastic core fiber converts the incident penetrating radiation in part to excimer radiation emission. In practice, penetrating radiation, as defined supra, penetrates the plastic core fiber where interaction with matrix material isotropically produces visible radiation. A portion of the visible radiation is directed along the length of the core fiber due to reflection at its interface with the plastic cladding material. Detection efficiency of a scintillating optical fiber for penetrating radiation is related to the interaction efficiency with the matrix material, the efficiency of the matrix material to produce visible light, the clarity and transparency of the matrix material to visible light produced, and the reflection efficiency at the core-fiber/cladding interface for the visible light produced.

Except for the nature of the inner core fiber the components of the scintillating optical fiber of this invention, and their methods of manufacture, are similar to those disclosed in Walker, U.S. Pat. No. 5,308,986 and Walker et al., U.S. Pat. No. 5,420,959, which are incorporated herein by reference.

Inner Plastic Core Fiber

The inner plastic core fiber is comprised of the polymeric scintillation compositions of this invention which have been fully described supra. In particular, the inner plastic core fiber comprises a scintillator composition for converting the incident penetrating radiation to visible light. The scintillator composition comprises: (1) a polymeric matrix material; and dissolved therein (2) a polycyclic aromatic compound which is an alkyl substituted naphthalene, aryl substituted naphthalene, or a compound containing at least three fused rings, wherein the polycyclic aromatic compound is present at about 5, or more, percent by weight of the inner plastic core fiber weight; and (3) 0 to about 3% of the inner core fiber weight of a fluorescent material. Optionally, the inner plastic core fiber may also contain one or more metal moieties as described supra.

The plastic core fiber of this invention may be a solid, a semi-solid or a liquid depending on the nature of the polymeric material as well as the nature and quantity of polycyclic aromatic compound contained therein. When a plastic scintillator contains very high concentrations of a liquid polycyclic aromatic compound, e.g. 20% bw or more, the scintillator formulation typically will be a soft semisolid or liquid possessing limited or no mechanical stability. In this instance the polymeric matrix material may be crosslinked as described supra, or the dimensional stability of the core fiber may be maintained by the surrounding plastic cladding material(s).

When the core fiber is solid the polymeric matrix material may contain one or more plasticizer(s) in order to optimize characteristics of the optical fiber core, e.g., Tg, index of refraction, and the like. The use of plasticizers in the core fiber and/or the plastic cladding material to change their Tg permits the easier processing in fiber and/or scintillating plate production. The plasticizer may be any conventional organic plasticizer provided that migration between the inner plastic core fiber and the plastic cladding material is controlled in a way that would preserve the detection efficiency over the typical life of the scintillating optical fiber. Useful plasticizers of this class include di-butylphthalate, butyl-octylphthalate, butylbenzylphthalate, di-cyclohexylphthalate, bibenzyl, and the like. In the instance where large amounts of the polycyclic aromatic compound are employed, the use of an added plasticizer to change Tg typically is unnecessary.

Plastic Cladding Material

The scintillating optical fiber contains a plastic cladding material which surrounds the inner plastic core fiber. The plastic cladding material has an index of refraction which is less than the index of refraction of the inner plastic core fiber, and comprises a second polymer or copolymer which is different from the predominant polymers or copolymers employed in the core fiber. Preferably, the plastic cladding has a glass transition temperature of about 30° C. or greater. Suitable materials for use as a plastic cladding are described in U.S. Pat. No. 5,420,959 (particularly col. 6, ln. 55 through col. 7 ln. 42). The second polymer or copolymer is transparent in at least a portion of the visible radiation spectrum and typically, has an index of refraction of about 1.45 or less and preferably between about 1.4 and 1.3 or less. Although the second polymer or copolymer may be selected from any polymer formulation meeting these optical criteria, a preferred class of second polymer is an amorphous fluoropolymer such as TEFLON® AF Amorphous Fluoropolymer, a fluorocarbon resin marketed by E. I. du Pont de Nemours & Co, Wilmington, Del. Because of the inherent characteristics of amorphous polymers, TEFLON® AF has a refractive index of 1.29–1.35 and possesses optical clarity of greater than 95% and transmission of visible light of greater than 90%. Moreover, unlike semicrystalline fluorocarbon resins, TEFLON® AF is soluble in selected solvents having a narrow solubility range in selected perfluorinated solvents facilitating preparation of pinhole free coatings.

A useful feature of the cladding materials in the scintillating optical fibers as disclosed herein is to impart structural integrity to the fiber. This can be important if the strength of the core fiber material has been seriously reduced by the addition of large amounts of polycyclic aromatic compound. For example, if the total additive concentration in the core fiber material is more than 25% by weight, the cladding can be important to impart mechanical integrity to the optical fiber. A second useful feature of the cladding is to act as a boundary to the diffusion of the polycyclic and fluor molecules within the matrix of the core. Thus although these additive molecules may have relatively high diffusion rates within the core composition, they have very low diffusion within a low refractive index, fluoropolymer cladding material. In this way, long term scintillation efficiency of the fiber is maintained.

Detection efficiency of the scintillating optical fiber (and spatial resolution of a scintillation plate made therefrom) is adversely impacted by the extent to which the isotropically produced light is transmitted through the sides of the core fiber as well as its leading end. In addition, extraneous light may enter the core fiber and be detected along with visible light produced by the penetrating radiation to produce an erroneous signal. The detection efficiency of the scintillating optical fiber (and spatial resolution of a scintillation plate made therefrom) may be further enhanced by the use of an outer cladding material which surrounds the plastic cladding material wherein the outer cladding material is substantially opaque to visible radiation thereby eliminating transmission of extraneous light into the core fiber. This outer cladding material may be a metal, an alloy or a fusible plastic material. When the outer cladding material is a metal or an alloy it may be clad with a fusible plastic material. Preferably, the outer cladding material is solely a fusible plastic material, the fusible plastic material typically will contain a colorant, such as a pigment, dye, or the like, in sufficient concentrations to render it opaque to visible light. The leading end of the scintillating optical fiber, upon which incident penetrating radiation is incident thereon, also may be coated with a material which is substantially reflective to visible radiation thereby substantially eliminating light loss through the incident end of the optical fiber. Typically, the reflective material is a thin metal, alloy, or metal-pigmented polymer film of aluminum, silver, copper, gold, titanium, or the like, wherein the metal and thickness of the film is chosen to minimize interaction with incident penetrating radiation.

Scintillating optical fibers may be manufactured by any means typically used for producing plastic optical fibers. Illustrative of such means are the manufacturing processes described in U.S. Pat. No. 5,308,986 and U.S. Pat. No. 5,420,959.

SCINTILLATOR PLATES

Scintillator plates of this invention are fiber optic arrays of scintillating optical fibers described supra. These plates have improved resolution needed for real-time radiographic systems, and, at the same time, have improved detection efficiency for low energy x-rays, γ-rays and thermal neutrons, so as to be comparable to or better than the efficiency of conventional screen/film systems. Advances embodied by this invention are particularly significant in the area of medical diagnostics and treatment such as, real-time mammography or real-time digital chest radiography, wherein patient x-ray exposure can be minimized. The advances also are significant in the area of real-time non-destructive testing. Scintillator plates containing lithium six (i.e., $^6$Li), boron ten (i.e., $^{10}$B), have improved efficiency and resolution in exclusively detecting thermal neutrons without detecting spurious γ-rays or x-rays.

In practice, the scintillator plate converts penetrating radiation incident thereon, to visible radiation to form a photon image. The scintillator plate comprises an array of the scintillating optical fibers of this invention which are fully described supra. The scintillator plate of this invention may be manufactured by any means typically used for producing plastic optical fiber plates. Illustrative of such means are the manufacturing processes described in U.S. Pat. No. 5,308,986 and U.S. Pat. No. 5,420,959. The axis of each fiber is oriented substantially parallel to the path of the incident penetrating radiation. Typically, the plastic cladding material or outer cladding material of each scintillating optical fiber is a fusible plastic material so that each scintillating optical fiber of the array may be fused to its neighboring scintillating optical fibers by the fusible plastic material. Alternatively, each scintillating optical fiber of the array may be glued to its neighboring scintillating optical fibers with a glue. Typically, each scintillating optical fiber has a diameter of about 1 millimeter or less and preferably between about 1 and 0.01 millimeter. The length of the scintillating optical fibers typically are between about 3 and about 30 millimeters. As described supra, the end of each of scintillating optical fiber, upon which penetrating radiation is incident thereon, is substantially reflective to visible radiation. This scintillator plate is characterized by an image resolution of about 5 line pairs per millimeter or better and a conversion efficiency of incident penetrating radiation to visible radiation of about 10% or greater and the image resolution is about 1 line pair per millimeter or better.

The scintillator plate of this invention is particularly useful in radiographic imaging systems for producing an instant image of a subject such as those disclosed in Walker, supra. Such a radiographic imaging system comprises in order: a source of penetrating radiation for traversing at least a portion of the subject; a position in the path of the penetrating radiation to locate the subject to be imaged; a scintillator plate of this invention to convert incident penetrating radiation to visible radiation to form a photon image; a charge coupled device camera to convert the photon image to a modulated electrical signal; and a monitor to convert the modulated electrical signal to a visible image or to capture the signal for data processing. The scintillator plates of this invention also may be used instead of conventional radiographic phosphor screens to provide an image for detection by conventional radiographic films and the like.

This invention will now be illustrated by the following examples but is not intended to be limited thereby.

EXAMPLE 1

A polystyrene foil scintillator containing pyrene was prepared and tested.

Pyrene (obtained from Aldrich Chemical Company, Inc., Milwaukee, Wis.) was further purified by a method described by Sangster, et al., J. Phys. Chem. 24,670 (1956) until a pure white powder was produced. 48 mg of the purified pyrene was dissolved in 3 ml of a methylene chloride solution containing 235 mg polystyrene (molecular weight of about 200,000) at room temperature. The solution was poured into a 6 cm diameter petri dish, which was then covered by a container to limit the evaporation rate of the methylene chloride. After four days, substantially all of the methylene chloride had evaporated leaving a polystyrene foil, 100 μm thick and containing 17% by weight of pyrene. The foil was removed from the dish and was determined to be uniformly thick to about 10%.

The ultraviolet (UV) absorption spectrum of the foil was determined with a Shimadzu UV 265 Spectrophotometer and at the long wavelength end of the UV spectra, i.e., at 380 nm, the absorption had fallen to almost zero.

Using the same foil, the front face emission spectrum was determined using a Perkin-Elmer LS-5B Spectrophotometer using an excitation radiation at 320 nm. The spectrum was intense, broad and featureless in the visible spectral region having an uncorrected emission maximum at 475 nm. As the emission wavelength decreased toward the blue end of the visible spectrum, a minimum at 415 nm was observed before showing structure in the UV with several maxima between 390 nm and 375 nm. The broad structureless emission observed is considered to be due to excimer emission of pairs of pyrene molecules, whereas, the UV emission is attributed to emission from single pyrene molecules. (These observations agreed with previous fluorescence studies of pyrene in polystyrene of Offen, et al., Journal of Chem. Phys. 43, 11, 4096 (1963). Offen likewise found, that as the concentration of pyrene was increased, the emission switches increasingly to the excimer type and achieves essentially 100% excimer emission at a concentration of $\geq$20% by weight.)

A necessary characteristic for transmission of scintillation light over long distances, is that the emitted light not be reabsorbed by the scintillator. Since there is negligible overlap of the absorption spectrum of the pyrene and its excimer emission spectrum, the pyrene/polystyrene foil met this scintillator criterion.

To test the foil as a scintillator, it was placed on the photocathode of a photomultiplier. The foil was coupled to the transparent window of the photocathode using optical grease. An Polonium ($^{210}$Po) radioactive source of α particles was placed directly on to the foil. The time integrated, charge output, pulse spectrum of the photomultiplier was recorded by a multichannel analyzer. A clear peak was observed corresponding to α particle detection. The pulse height of this peak was recorded. A similar measurement was made using a foil of the commercial Bicron 404 scintillator and compared to that of the pyrene foil. The pulse height from foil containing pyrene was 65% higher than that from the Bicron scintillator. No correction was made to the data for the difference in photocathode efficiency to the two spectra. Since the cathode is more sensitive to the 410 nm emission of the Bicron scintillator, application of this correction would further enhance the pulse height of the pyrene scintillator by about 20%. Since the Bicron scintillator has been measured (Bicron Corp.) to have 66% of the scintillation light output of anthracene, the light output of the pyrene scintillator is estimated to be 115% that of anthracene. Surprisingly, this simple pyrene/polystyrene foil functions as a very bright scintillating detector of heavily ionizing radiations.

EXAMPLE 2

A solid cylindrical polystyrene scintillator containing pyrene was prepared and tested.

Styrene was first treated to remove inhibitor by passing the styrene through a column. The column contained Dehibit 100 macroreticular ion exchange resin from Polysciences, Inc., Warrington, Pa. The monomer was then purified by vacuum distillation.

A glass polymerization tube having a cylindrical cross section with an inside diameter of 1 cm, was cleaned, rinsed with distilled water, and then air dried. To the cleaned polymerization tube containing hot (60° C.) purified styrene, was added 17% by weight of the purified pyrene of Example 1. The resulting solution was degassed by repeated freeze-vacuum-thaw cycles. The styrene solution was polymerized by immersing the tube in a silicone oil bath at 110° C. for 24 hours, and then at 125° C. for 48 hours, and finally at 140° C. for 12 hours. After removal from the oil bath, the tube was quenched in liquid nitrogen for fast release of the polymerized styrene billet. The styrene billet was cut and polished to form a 1 cm diameter, 1 cm long right cylindrical scintillator. The scintillation light output of the scintillator was measured as in Example 1 and compared to a similar sample of Bicron 404 material, except that the radioactive source used was the electron (βparticle) emitter Bismuth, $^{208}$Bi. Within a ±5% experimental error, the same result as in Example 1 was obtained. This characteristic is required for a very bright scintillating detector of x, γ, β, α or other forms of ionizing radiation.

EXAMPLE 3

A liquid toluene scintillator containing pyrene was prepared and tested.

A toluene solution containing 20% by weight of the purified pyrene of Example 1 was prepared. Fluorescence spectra of the solution was determined and was found to be entirely pyrene excimer radiation, with emission peaking at 480 nm and having negligible overlap with the pyrene UV absorption spectra. The underside of a Petri dish was optically coupled to the photomultiplier described in Example 1, and was filled to a depth of 1 cm with the pyrene scintillator solution. A Bismuth, $^{208}$Bi electron source was located 3 mm above the surface of the solution. The pulse height distribution from the photomultiplier was measured as in Example 1. A well defined peak was observed corresponding to the unique energy of the electron source.

A conventional toluene solution containing 0.5% by weight of para-terphenyl (PTP) plus 0.1% by weight of para-bis [-(5-phenyl-oxazolyl)]benzene (POPOP) was prepared in the same way as the pyrene solution scintillator, and the pulse height distribution of this conventional scintillator solution was measured using the same Bismuth, $^{208}$Bi electron source. The peak pulse height from the pyrene solution was found to be 80% higher than that from the conventional PTP/POPOP solution.

EXAMPLE 4

The scintillation decay times of the pyrene excimer emission in Examples 1, 2, and 3 were measured using conventional methods and were found to be about 65 to 70 nanoseconds. For some applications, a much shorter decay time is desirable. A much shorter decay time for the pyrene excimer scintillator was accomplished as follows: 0.1% by weight of Coumarin 545 was added to the 20% by weight pyrene solution described in Example 3. Coumarin 545 dye, i.e., 2,3,6,7,-tetrahydro-10-(2'-benzimidazolyl)-1H,5H,11H-[1]benzopyrano-[6,7,8-ij]quinolizin-11-one, (a product of Exciton Chemical Company, Dayton, Ohio) has a large absorption efficiency at 480 nm and a short lived fluorescent emission at 520 nm. As in Example 3, the fluorescence spectra of the solution was determined and the pulse height distribution of this scintillator solution was measured. The fluorescence spectra of the solution found to be that of the Coumarin 545 dye with emission peaking at about 525 nm. However, the scintillation decay time of this emission was found to be about 5 nanoseconds. In addition, the measured pulse height distribution from the photomultiplier was essentially unchanged from that of the pyrene solution of Example 3 after correction for the wavelength dependence of the photomultiplier.

The use of the added Coumarin 545 dye to achieve a short scintillation time constant is considered to function by the following mechanism: A pyrene excimer is formed from irradiation as described supra. The pyrene excimer then rapidly transfers its energy to the Coumarin 545 which has its large absorption efficiency at 480 nm. The excited Coumarin 545 then fluoresces with its short 5 nanosecond lifetime. This technique of achieving a short scintillation time constant for pyrene excimer scintillators can be used with a variety of fluorescent dyes other than Coumarin 545. The requirements are, a large extinction coefficient at 480 nm, high quantum efficiency, and short fluorescence decay time. These dyes can be used in either solution or solid polymeric matrices which contain pyrene at high concentration.

EXAMPLE 5

A 100 micron thick polystyrene foil containing 15% by weight of fluoranthene was made in a manner similar to that described in Example 1. Fluoranthene, was obtained from Aldrich Chemical Company, Inc., as a white crystalline powder and was used without further purification. The UV absorption spectrum and emission spectrum of the foil were measured as in Example 1. A broad and structureless emission spectrum, which peaked at 450 nm, was observed and was characteristic of excimer emission. As with pyrene, there was essentially no overlap between the emission spectra and the absorption spectra which peaked at 355 nm.

The scintillation light output was measured using an Polonium α particle source as described in Example 1. The peak pulse height was measured to be 50% higher than the corresponding pulse from the Bicron 404 scintillator. In this case, the scintillation light decay time was measured to be about 10 nanoseconds. These are the characteristics of a very bright, superior light transmission, and short decay time plastic scintillator.

EXAMPLE 6

Scintillating polystyrene foils each 100 micron thick were made according to the method described in Example 1 using 15% by weight of the following fluorescent aromatic compounds: dimethylnaphthalene, acenaphthene, and fluorene. In each case a fluorescent dye, tetraphenylbutadiene (TPB), was added at 1% weight. The purpose of the TPB was to absorb energy from the excited aromatic compound and emit scintillation light at about 420 nm. The table below shows the relative emission output of these scintillating compositions compared to a composition containing only TPB:

| AROMATIC COMPOUND | RELATIVE EMISSION |
| --- | --- |
| None | 1.0 |
| Dimethylnaphthalene | 1.51 |
| Acenaphthene | 1.49 |
| Fluorene | 1.47 |

In each scintillator where an aromatic compound is present, there is a dramatic increase in scintillating light emission.

EXAMPLE 7

A bright scintillating plate used for radiographic detection of x-rays was made as follows.

A standard coextrusion system was used to fabricate a 1 mm width square clad fiber. The core extruder was designed to have very high efficiency polymer mixing. Polystyrene granules were fed into a hopper of the core extruder. An inlet port, at an appropriate downstream location along the length of the core extruder barrel, was fed with liquid by a suitable gear pump. This liquid was a 50/50 mixture of 1-methyl-napthalene and trimethylphenyltin. The trimethylphenyl-tin contained 10% by weight tetraphenylbutadiene. The mass feed rate of liquid relative to polymer was adjustable but typically was in the range 20 to 30%. The extrudate had low structural integrity, but was surrounded and encased by the cladding polymer supplied by the second extruder of the coextruder system. Two different polymers used for cladding were polymethylmethacrylate and TEFLON® AF 1600 amorphous fluoropolymer (a product of E. I. du Pont de Nemours & Co., Wilmington, Del.) of which TEFLON® AF 1600, which has an index of refraction of 1.31, is preferred. The feed rate of the cladding extruder was adjusted to provide a fiber cladding thickness of about 30 μm. Structural integrity of the clad fiber was dominated by the physical properties of the cladding polymer. The resulting extruded clad scintillating optical fiber had a 1 mm×1 mm square cross-section.

A 30 mm×30 mm cross-section fiber optic bundle preform was prepared by stacking segments (about 900 mm long) of the 1 mm×1 mm scintillating optical fiber in a square cross section glass tube having a 30 mm×30 mm square cross-section. The square tube was then placed in a vacuum oven and the temperature gradually raised over a period of about 60 minutes to about 200° C. thereby fusing together the fibers with some expansion of the core, to form the fiber optic bundle preform. The plastic preform was released from the glass by lowering the glass tube into liquid nitrogen.

A 1 mm×1 mm square cross-section fiber optic bundle was drawn from the bundle preform using conventional means. The 1.0 mm$^2$ fiber bundle produced contained about 900 scintillating optical fibers, each of which has a square cross section having a core thickness of about 33 μm and an outer cladding thickness of 1.0 μm.

As disclosed in Example 2 of U.S. Pat. No. 5,308,986, a scintillator plate may be prepared for use in a high resolution digital mammography system by thermally fusing together short pieces of the fiber optic bundles produced supra, to form a large array of the square micro-fibers.

As set forth in that disclosure, the 1.0 mm$^2$ square fiber bundles produced are cut into segments about 14 mm long. The pieces are stacked endwise into a non-rectilinear, rectangular metal frame, 50 mm long and 12 mm wide, and arranged to be parallel to the direction of the incident x-rays so that fiber bundles at the ends of the frame are oriented at about a 2.5° angle relative to the normal at the center of the frame, and then clamped in place. The frame with the clamped pieces in place, is then heated in a vacuum oven and the temperature is gradually raised over a period of about 20 minutes to 200° C. After cooling to room temperature, the fiber bundle array is cut and polished to a nominal 10 mm thickness. A reflective surface of aluminum is then vapor deposited on the polished, incident end of the scintillator fiber plate.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A scintillator system for detecting incident penetrating radiation, comprising:
   A) a scintillator composition for converting the incident penetrating radiation to visible light, comprising:
      1) a matrix material; and dissolved therein,
      2) a polycyclic aromatic compound which is an alkyl substituted naphthalene, aryl substituted naphthalene, or a compound containing at least three fused rings, wherein the polycyclic aromatic compound is present at about 5, or more, percent of the scintillator weight; and
      3) 0 to about 3% of the scintillator weight of a fluorescent material; and
   B) a detection system for recording the visible light.

2. The scintillator system of claim 1 wherein the visible light is partially composed of excimer radiation emission.

3. The scintillator system of claim 1 wherein the polycyclic aromatic compound is a liquid.

4. The scintillator system of claim 1 wherein the polycyclic aromatic compound is taken from the group consisting of methyl naphthalene, phenyl naphthalene, phenanthrene, chrysene, pyrene, 3:4-benzpyrene, naphthacene, triphenylene, acenapthene, and fluoranthene.

5. The scintillator system of claim 1 wherein the polycyclic aromatic compound is substituted with one to four alkyl groups wherein each alkyl group individually is a $C_1$ to $C_4$ alkyl group.

6. The scintillator system of claim 1 wherein the polycyclic aromatic compound is methyl naphthalene, pyrene or 3:4-benzpyrene.

7. The scintillator system of claim 1 wherein the polycyclic aromatic compound is present at about 10, or more, percent of the scintillator weight.

8. The scintillator system of claim 1 wherein the polycyclic aromatic compound has a boiling or sublimation point at atmospheric pressure of about 240° C. or greater.

9. The scintillator system of claim 1 wherein the matrix material is a liquid solvent for the polycyclic aromatic compound.

10. The scintillator system of claim 9 wherein the liquid solvent is taken from the group consisting of benzene, toluene, xylene, and mixtures thereof.

11. The scintillator system of claim 1 wherein the matrix material is a free radical, addition polymerizable monomer having one or more terminal, ethylenically unsaturated groups.

12. The scintillator system of claim 11 wherein the free radical, addition polymerizable monomer is a miscible monomer taken from the group consisting of styrene, vinyltoluene, vinylxylene, $C_2$ to $C_{20}$ alkyl styrene, divinylbenzene, methyl methacrylate and mixtures thereof.

13. The scintillator system of claim 1 wherein the matrix material is a polymeric matrix material.

14. The scintillator system of claim 13 wherein the polymeric matrix material comprises one or more aromatic polymer(s) or copolymer(s).

15. The scintillator system of claim 14 wherein the aromatic polymer is polystyrene, polyvinyltoluene, polyvinylxylene, polyvinylnapthalene, polyvinylbiphenyl, polyvinylterphenyl, polyvinyianthracene, or mixtures thereof.

16. The scintillator system of claim 14 wherein the polymeric matrix material is a copolymer of styrene, vinyltoluene, vinylxylene, a $C_2$ to $C_{20}$ alkyl-styrene, divinylbenzene, or combinations thereof.

17. The scintillator system of claim 13 wherein the polymeric matrix material comprises one or more acrylic polymer(s) or copolymer(s).

18. The scintillator system of claim 13 wherein the polymeric matrix material is a crosslinked polymeric material.

19. The scintillator system of claim 18 wherein the crosslinked polymeric material is formed during polymerization using a crosslinking agent which is an addition polymerizable monomer having two or more terminal ethylenic groups.

20. The scintillator system of claim 18 wherein the polycyclic aromatic compound is a liquid; and wherein the polycyclic aromatic compound is present at about 15, or more, percent of the scintillator weight.

21. The scintillator system of claim 1 wherein the fluorescent material comprises about 0.01% or more of the scintillator weight.

22. The scintillator system of claim 21 wherein the fluorescent material is a compound which fluoresces in at least a portion of the visible radiation spectrum.

23. The scintillator system of claim 21 wherein the fluorescent material is chemically bonded to a polymeric matrix material.

24. The scintillator system of claim 1 wherein the scintillator contains a metal moiety.

25. The scintillator system of claim 24 wherein the metal moiety is an inorganic compound or an organo-metallic compound.

26. The scintillator system of claim 24 wherein the metal moiety is taken from the group consisting of lead, bismuth, tin, lithium six, boron ten, indium, gadolinium, and combinations thereof.

27. The scintillator system of claim 24 wherein the metal moiety emits light when excited by radiation.

28. The scintillator system of claim 27 wherein the metal moiety is a phosphor.

29. The scintillator system of claim 24 wherein the metal moiety which is taken from the group consisting of tetraethyl lead, tetrabutyl lead, tetraphenyl lead, triphenylmethyl lead, lead hexahydrobenzoate, hexahydroborate, trimethylphenyl tin, dicarbadodecarborane, and combinations thereof.

30. The scintillator system of claim 1 wherein the detection system for recording the visible light comprises a photo-electric system.

31. The scintillator system of claim 1 wherein the detection system for recording the visible light comprises a photographic system.

32. A scintillating optical fiber for detecting incident penetrating radiation, comprising:
   a) an inner plastic core fiber, wherein the inner plastic core fiber is transparent in at least a portion of the visible radiation spectrum and has an index of refraction of about 1.40 or greater, wherein the inner plastic core fiber comprises the scintillator composition of claim 13 for converting the incident penetrating radiation to visible light, and wherein the matrix material of the scintillator composition consists essentially of a polymeric matrix material; and
   b) a plastic cladding material which surrounds the inner plastic core fiber and which has an index of refraction which is less than the index of retraction of the inner plastic core fiber by a difference of about 0.05 or more.

33. The scintillating optical fiber of claim 32 wherein the plastic cladding has a glass transition temperature of about 30° C. or greater.

34. The scintillating optical fiber of claim 32 wherein the inner plastic core fiber is solid, semi-solid or liquid.

35. The scintillating optical fiber of claim 32 wherein the plastic cladding material which surrounds the inner plastic core fiber, comprises an amorphous fluoropolymer.

36. The scintillating optical fiber of claim 32 wherein an outer cladding material surrounds the plastic cladding material and wherein the outer cladding material is substantially opaque to visible radiation.

37. A scintillator plate to convert incident penetrating radiation to visible light to form a photon image which comprises an array of the scintillating optical fibers of claim 32, the axis of each fiber being substantially parallel to the path of the incident penetrating radiation.

38. The scintillator plate of claim 37 wherein the plastic cladding material is a fusible plastic material and wherein each scintillating optical fiber of the array is fused to its neighboring scintillating optical fibers by the fusible plastic material.

39. The scintillator plate of claim 37 wherein each scintillating optical fiber of the array is glued to its neighboring scintillating optical fibers with a glue.

40. The scintillator plate of claim 37 wherein each of the scintillating optical fibers has diameter of about 1 millimeter or less.

41. The scintillator plate of claim 37 wherein the length of the scintillating optical fibers are between about 3 and about 30 millimeters.

42. The scintillator plate of claim 37 wherein the end of each of the scintillating optical fibers, upon which the incident penetrating radiation is incident thereon, is substantially reflective to the visible radiation.

43. The scintillator plate of claim 37 wherein the conversion efficiency of incident penetrating radiation to visible radiation is about 10% or greater, and the image resolution is about 1 line pair per millimeter or better.

44. A solid scintillating plate for detecting incident penetrating radiation over the plate area, comprising the scintillator composition of claim 1 wherein the matrix material is a crosslinked polymeric matrix material.

45. A scintillator system for detecting incident penetrating radiation, comprising:

A) a scintillator composition for converting the incident penetrating radiation to visible light, comprising:
 1) a polymeric matrix material; and dissolved therein,
 2) naphthalene which is present at about 15, or more, percent of the scintillator weight; and
 3) 0 to about 3% of the scintillator weight of a fluorescent material; and B) a detection system for recording the visible light.

* * * * *